(12) United States Patent
Melén

(10) Patent No.: US 9,594,470 B2
(45) Date of Patent: Mar. 14, 2017

(54) METHODS AND SOFTWARE FOR FACILITATING THE SELECTION OF MULTIPLE ITEMS AT AN ELECTRONIC DEVICE

(71) Applicant: BlackBerry Limited, Waterloo (CA)

(72) Inventor: Sven Ola Petter Melén, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 138 days.

(21) Appl. No.: 14/025,252

(22) Filed: Sep. 12, 2013

(65) Prior Publication Data

US 2015/0074606 A1 Mar. 12, 2015

(51) Int. Cl.
| G06F 3/0481 | (2013.01) |
| G06F 3/0488 | (2013.01) |
| G06F 3/0482 | (2013.01) |
| G06F 3/0484 | (2013.01) |
| G06F 3/0485 | (2013.01) |
| G06F 3/0486 | (2013.01) |

(52) U.S. Cl.
CPC ........ *G06F 3/04817* (2013.01); *G06F 3/0482* (2013.01); *G06F 3/0484* (2013.01); *G06F 3/0485* (2013.01); *G06F 3/0486* (2013.01); *G06F 3/0488* (2013.01); *G06F 3/04842* (2013.01)

(58) Field of Classification Search
CPC .............................. G06F 3/0481; G06F 3/0488
See application file for complete search history.

(56) References Cited

U.S. PATENT DOCUMENTS

2009/0282332 A1* 11/2009 Porat ............................. 715/702
2010/0138776 A1* 6/2010 Korhonen ..................... 715/786
(Continued)

FOREIGN PATENT DOCUMENTS

| EP | 2325739 | 5/2011 |
| EP | 2631738 | 8/2013 |

OTHER PUBLICATIONS

European Patent Office, Extended European Search Report issued in connection with EP Application No. 14184633.7, dated Jan. 29, 2015, 9 pages.
(Continued)

*Primary Examiner* — David Choi
(74) *Attorney, Agent, or Firm* — Fish & Richardson P.C.

(57) ABSTRACT

A computer-implemented method of facilitating the selection of multiple items at an electronic device having a touch sensitive display and for receiving user input, the device, comprising: displaying on the display a grid list of icons representing selectable items, the icons being ordered in the grid: in rows extending in a first direction and being arranged consecutively in a second direction orthogonal to the first direction, the grid list comprising at least one column; or in columns extending in a first direction and being arranged consecutively in a second direction orthogonal to the first direction, the grid list comprising at least one row; and, in response to the device receiving user input in the form of a touch starting from a first icon and continuing forwards or backwards in the first direction, causing items represented by icons adjacent to the first icon forwards or backwards in the ordered grid list to be selected consecutively.

16 Claims, 4 Drawing Sheets

(56) References Cited

U.S. PATENT DOCUMENTS

| | | |
|---|---|---|
| 2010/0309147 A1 | 12/2010 | Fleizach et al. |
| 2012/0030566 A1* | 2/2012 | Victor .......................... 715/702 |
| 2013/0024821 A1* | 1/2013 | Lee .............................. 715/863 |
| 2013/0055164 A1* | 2/2013 | Bergsbjork ................... 715/845 |
| 2013/0124978 A1* | 5/2013 | Horns et al. .................. 715/243 |
| 2013/0227450 A1* | 8/2013 | Na et al. ....................... 715/764 |
| 2013/0239063 A1* | 9/2013 | Ubillos et al. ................ 715/838 |
| 2013/0326421 A1* | 12/2013 | Jo ................................. 715/841 |
| 2014/0181740 A1* | 6/2014 | Gachoka et al. ............. 715/802 |
| 2015/0074606 A1* | 3/2015 | Melen ........................... 715/835 |

OTHER PUBLICATIONS

Communication Pursuant to Article 94(3) EPC issued in European application No. 14184633.7 on Aug. 11, 2016.

* cited by examiner

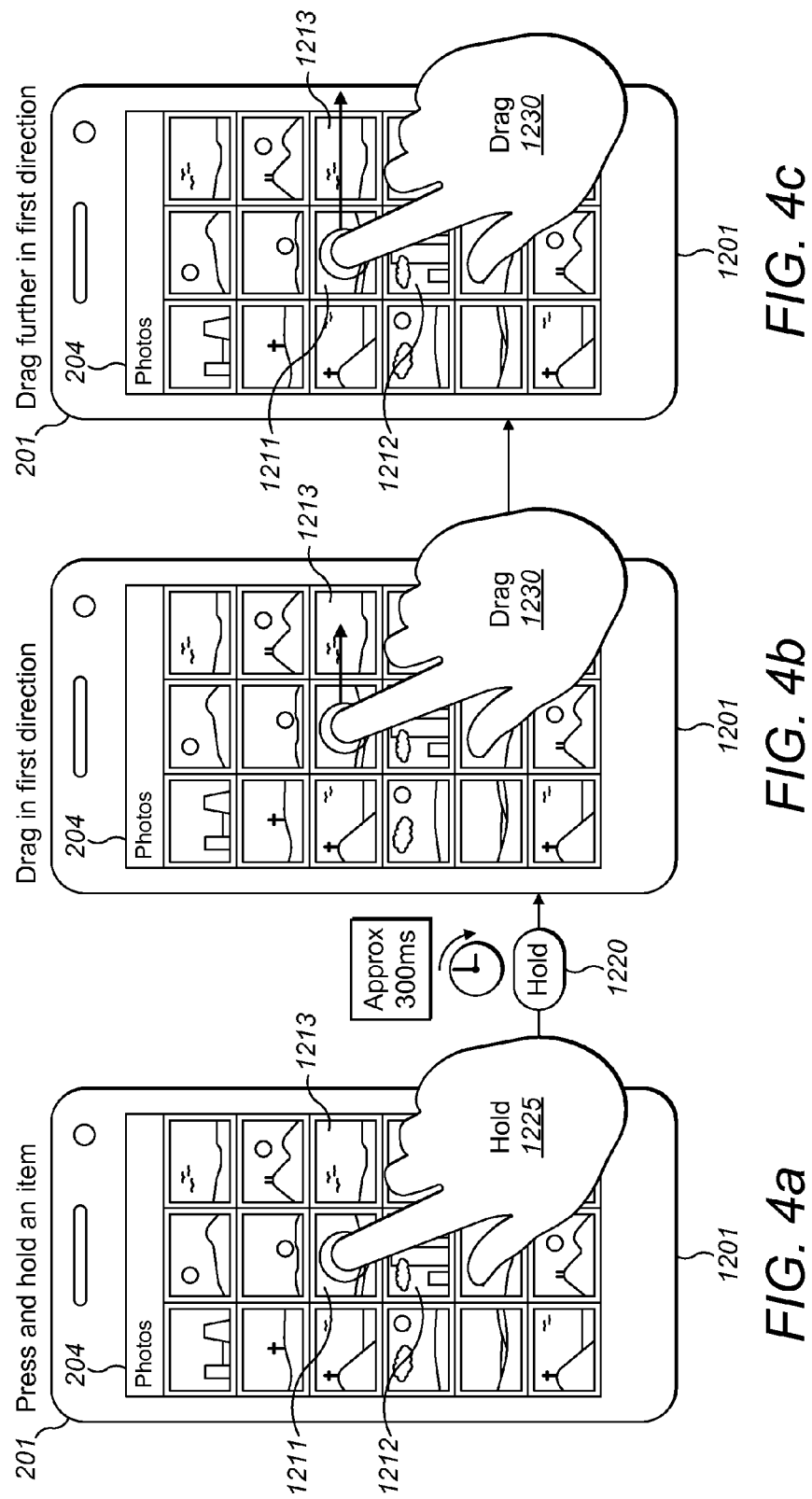

METHODS AND SOFTWARE FOR FACILITATING THE SELECTION OF MULTIPLE ITEMS AT AN ELECTRONIC DEVICE

FIELD OF THE TECHNOLOGY

This present disclosure relates to methods and software for facilitating the selection of multiple items at an electronic device and, more particularly, to user interfaces used within those devices for facilitating the selection of multiple items at an electronic device.

BACKGROUND

Electronic devices are in many cases provided with one or more displays for providing visual information to users of the devices. The electronic devices can be provided with user interfaces for display on the display of the device for facilitating user interaction with, and operation of, the device via one or more user inputs. The user interfaces comprise visual elements that can be arranged in various manners on the screen and can represent, for example, executable software programs, menu items indicating selectable functionality or operations available to the user within programs, a state of some aspect of program or data or other function of the device, etc. User inputs such as trackpads, trackballs, mice, cursors, touch screens and multitouch screens, can provide pointer-type controls usable to adjust the position of a pointer in multiple dimensions to allow interaction with the user interface by, for example, enabling navigation through menu systems, options, file systems, program shortcuts etc, and enabling selection and manipulation of visual elements and the items they represent.

Electronic devices, in particular, small formal portable electronic devices such as smart phones and tablet computers, having a touchscreen or multitouch screen as the primary means for receiving user input for controlling the user interface, are now commonly available. These devices are typically limited in the on-screen real-estate they have available and the more tactile and direct nature of the touchscreen driven user interfaces of these devices lends itself user interactions that are immediate and intuitive. However, the inability of users to immediately and intuitively understand the user inputs and gestures that would be required to achieve relatively complex interactions and operations can have a limiting effect on the usability of these interfaces. That is, these interfaces typically currently implement recognition of only relatively simple immediately and intuitively understandable touch gestures that perform simple interactions, and instead rely on the user to perform multiple simple gestures (e.g. selection/deselection of buttons and manipulation of other UI elements, such as touch keyboards) to perform these more complex interactions. This is to the detriment of their intended quickness and immediacy of usability. The additional steps and UI elements required to perform complex interactions take up a user's time and the available space on the display, which can be frustrating to a user, who may as a result become dissatisfied with the device.

There is a need for touchscreen-driven user interfaces that are simple enough to be intuitive to new users, while still allowing a user to perform complex actions quickly. Furthermore, with a finite amount of screen real estate available on displays for electronic devices, there is a need for user interfaces that can perform their function while minimising the amount of screen space used that could otherwise be utilised for displaying content.

BRIEF DESCRIPTION OF DRAWINGS

Examples of the present proposed approach will now be described in detail with reference to the accompanying drawings, in which:

FIGS. 4A-4C illustrate an electronic device in accordance with an embodiment showing the operation of a user interface having an ordered grid list of icons representing selectable items and an exemplary user input gesture to select multiple items from the list.

DETAILED DESCRIPTION

Figure 1:
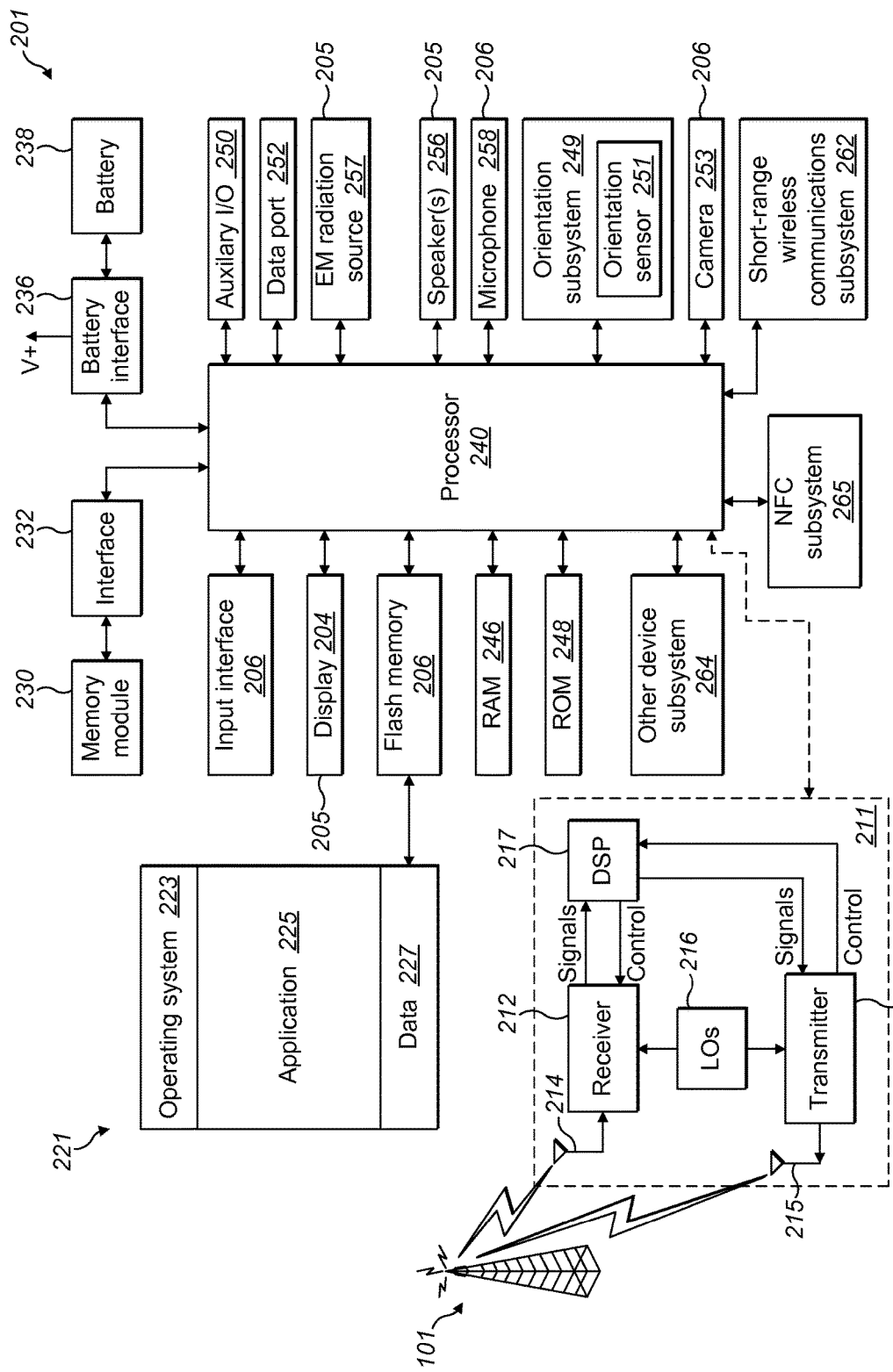
FIG. 1 is a block diagram illustrating an electronic device in accordance with example embodiments of the present disclosure.

Viewed from one aspect, in embodiments, the present disclosure provides a computer-implemented method of facilitating the selection of multiple items at an electronic device having a touch sensitive display and for receiving user input, the device, comprising: displaying on the display a grid list of icons representing selectable items, the icons being ordered in the grid:

in rows extending in a first direction and being arranged consecutively in a second direction orthogonal to the first direction, the grid list comprising at least one column; or in columns extending in a first direction and being arranged consecutively in a second direction orthogonal to the first direction, the grid list comprising at least one row;

and, in response to the device receiving user input in the form of a touch starting from a first icon and continuing forwards or backwards in the first direction, causing items represented by icons adjacent to the first icon forwards or backwards in the ordered grid list to be selected consecutively.

In embodiments, the method further comprises displaying a visual indication of the selection of the items in relation to the representative icons.

In embodiments, when the continuous touch remains in the row/column containing the first item, the method comprises causing only the items represented by adjacent icons to have been touched to be selected. In further embodiments, when the continuous touch is continued in the first direction beyond the end of the row/column containing the first item, the method comprises causing items represented by icons in the next row/column in the ordered grid list to be selected consecutively. In yet further embodiments, when the continuous touch is continued in the first direction beyond the end of the row/column containing the first item, the grid list is automatically scrolled in the second direction. In yet further embodiments, the grid list is scrolled in the second direction when the continuous touch is continued in the first direction beyond the end of the row/column containing the first item to display another row/column of the grid list:

when the last visible item in the grid list is selected; or to cause the row/column containing the icon representing the current last selected item to be displayed adjacent the touch. In yet further embodiments, the method further comprises accelerating the rate of selection of items represented by adjacent icons in the grid list in response to the touch being continued in the first direction beyond the end of the row/column containing the first item or further beyond the end of the row/column containing the first item.

In embodiments, the method further comprises only causing the multiple items to be selected in response to the continuous touch remaining static in relation to a first icon for a predetermined period of time before continuing in the first direction.

In embodiments, the method further comprises causing the multiple items to be selected in response to the continuous touch regardless of a dwell time of the touch in relation to a first icon before the touch continues in the first direction.

In embodiments, the method further comprises deselecting a selected item in response to the continuous touch being retraced backwards in the first direction.

In embodiments, the method further comprises, after the continuous touch has ceased, deselecting a selected item in response to receipt of a touch in relation to the icon representing the selected item.

In embodiments, the method further comprises allowing a further selection of multiple items in the grid list in response to the device receiving user input in the form of a further touch starting from a second icon and continuing forwards or backwards in the first direction, causing items represented by icons adjacent to the first icon forwards or backwards in the ordered grid list to be selected consecutively.

In embodiments, the method further comprises causing the displayed grid list to be scrolled in response to receipt of a touch gesture extending in the second direction including a flick or a swipe.

In embodiments, the method further comprises, entering a multiple select mode of interaction in response to receipt of the continuous touch, such that all subsequent static touches or continuous touches in the first direction in relation to the grid list icons cause the items represented by the icons to be selected/deselected.

In further embodiments, the ordered grid list of icons represents one or more of the group comprising: images, photographs, videos, audio files, contacts, documents, spreadsheets, attachments, emails or other files.

In embodiments, the method further comprises causing a selection of adjacent items in the ordered grid list even across multiple rows/columns in response to receipt of simultaneous touches on two icons, the items represented by all icons between and including the two icons being selected.

Viewed from another aspect, in embodiments, the present disclosure provides an electronic device comprising: a touch sensitive display for receiving user input; one or more processors; and memory comprising instructions which when executed by one or more of the processors cause the electronic device to: display on the display a grid list of icons representing selectable items, the icons being ordered in the grid:
   in rows extending in a first direction and being arranged consecutively in a second direction orthogonal to the first direction, the grid list comprising at least one column; or
   in columns extending in a first direction and being arranged consecutively in a second direction orthogonal to the first direction, the grid list comprising at least one row;
and, in response to the device receiving user input in the form of a touch starting from a first icon and continuing forwards or backwards in the first direction, cause items represented by icons adjacent to the first icon forwards or backwards in the ordered grid list to be selected consecutively.

Viewed from yet another aspect, in embodiments, the present disclosure provides a computer readable medium comprising instructions which when executed by one or more of the processors of an electronic device having a touch sensitive display for receiving user input, cause the electronic device to: display on the display a grid list of icons representing selectable items, the icons being ordered in the grid:
   in rows extending in a first direction and being arranged consecutively in a second direction orthogonal to the first direction, the grid list comprising at least one column; or
   in columns extending in a first direction and being arranged consecutively in a second direction orthogonal to the first direction, the grid list comprising at least one row;
and, in response to the device receiving user input in the form of a touch starting from a first icon and continuing forwards or backwards in the first direction, cause items represented by icons adjacent to the first icon forwards or backwards in the ordered grid list to be selected consecutively.

In embodiments, the instructions further cause the electronic device to display a visual indication of the selection of the items in relation to the representative icons.

In embodiments, when the continuous touch remains in the row/column containing the first item, the instructions further cause the electronic device to cause only the items represented by adjacent icons to have been touched to be selected. In further embodiments, when the continuous touch is continued in the first direction beyond the end of the row/column containing the first item, the instructions further cause the electronic device to cause items represented by icons in the next row/column in the ordered grid list to be selected consecutively. In yet further embodiments, when the continuous touch is continued in the first direction beyond the end of the row/column containing the first item, the grid list is automatically scrolled in the second direction. In yet further embodiments, the grid list is scrolled in the second direction when the continuous touch is continued in the first direction beyond the end of the row/column containing the first item to display another row/column of the grid list:
   when the last visible item in the grid list is selected; or
   to cause the row/column containing the icon representing the current last selected item to be displayed adjacent the touch. In yet further embodiments, the instructions further cause the electronic device to accelerate the rate of selection of items represented by adjacent icons in the grid list in response to the touch being continued in the first direction beyond the end of the row/column containing the first item or further beyond the end of the row/column containing the first item.

In embodiments, the instructions further cause the electronic device to only cause the multiple items to be selected in response to the continuous touch remaining static in relation to a first icon for a predetermined period of time before continuing in the first direction.

In embodiments, the instructions further cause the electronic device to cause the multiple items to be selected in response to the continuous touch regardless of a dwell time of the touch in relation to a first icon before the touch continues in the first direction.

In embodiments, the instructions further cause the electronic device to deselect a selected item in response to the continuous touch being retraced backwards in the first direction.

In embodiments, the instructions further cause the electronic device to, after the continuous touch has ceased, deselect a selected item in response to receipt of a touch in relation to the icon representing the selected item.

In embodiments, the instructions further cause the electronic device to allow a further selection of multiple items in the grid list in response to the device receiving user input in the form of a further touch starting from a second icon and continuing forwards or backwards in the first direction, causing items represented by icons adjacent to the first icon forwards or backwards in the ordered grid list to be selected consecutively.

In embodiments, the instructions further cause the electronic device to cause the displayed grid list to be scrolled in response to receipt of a touch gesture extending in the second direction including a flick or a swipe.

In embodiments, the instructions further cause the electronic device to enter a multiple select mode of interaction in response to receipt of the continuous touch, such that all subsequent static touches or continuous touches in the first direction in relation to the grid list icons cause the items represented by the icons to be selected/deselected.

In further embodiments, the ordered grid list of icons represents one or more of the group comprising: images, photographs, videos, audio files, contacts, documents, spreadsheets, attachments, emails or other files.

In embodiments, the instructions further cause the electronic device to cause a selection of adjacent items in the ordered grid list even across multiple rows/columns in response to receipt of simultaneous touches on two icons, the items represented by all icons between and including the two icons being selected.

Other example embodiments of the present disclosure will be apparent to those of ordinary skill in the art from a review of the following detailed description in conjunction with the drawings.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244.

As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
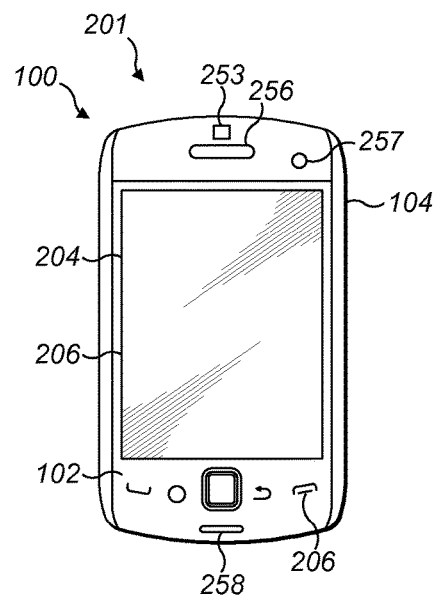
FIG. 2 is a front view of a phone in accordance with example embodiments of the present disclosure.

Referring now to FIG. 2, the electronic device 201 could be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may be a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 also includes other input interfaces 206 such as one or more buttons, keys or navigational input mechanisms. In the example illustrated, at least some of these additional input interfaces 206 are disposed for actuation at a front side 102 of the phone.

Figure 3:
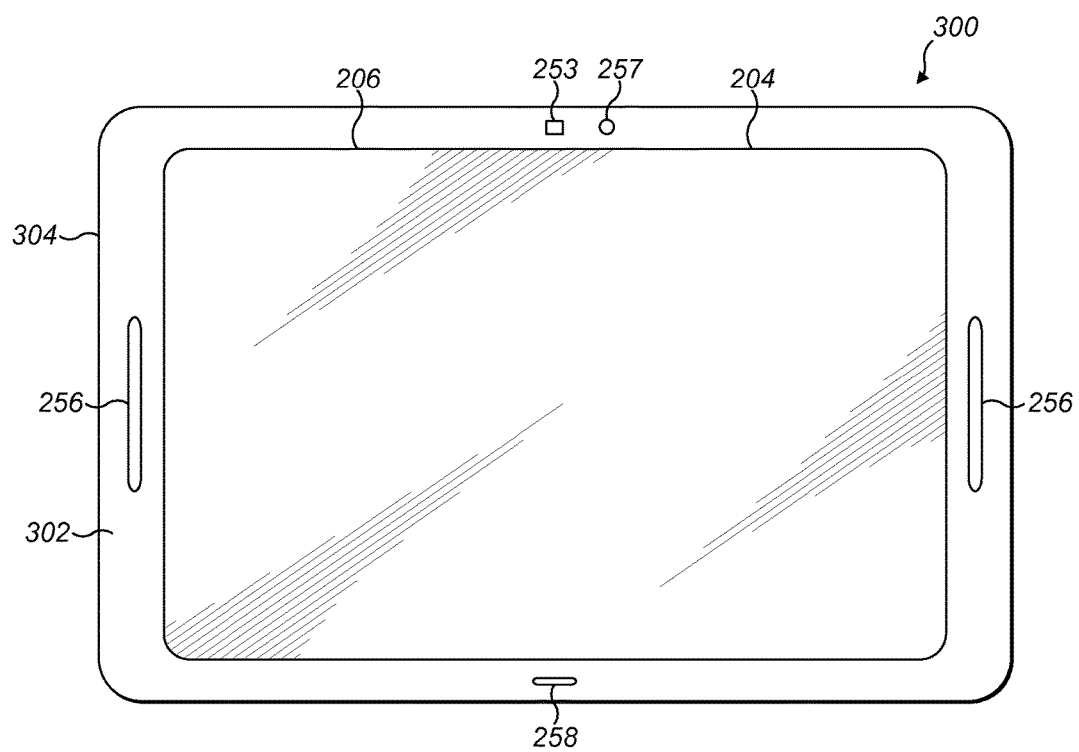
FIG. 3 is a front view of a tablet computer is accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components. The tablet computer 300 includes a housing 304 which houses at least some of the components discussed above with reference to FIG. 1. The tablet computer 300 could support cellular wireless communication and/or non-cellular wireless communication.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

Referring now to FIG. 4, electronic device 201, in this instance a smartphone, is displaying a user interface 204 containing a grid of icons 1211, 1212, 1213 representing items, which may be items of "content" and of one or many different content types. In this specification, content items (referred to as 'items') are defined as any entities displayed to the user (by proxy of icons) that can be selected and can have actions performed on the data or media that they represent.

For example, in the illustrative examples shown in FIG. 4, image files are considered content items because they can be selected by the user interface and there are a number of actions (such as 'share' and 'delete') that can be applied to them. Here, the image files (i.e. the "items") are represented by icons 1211, 1212, 1213, which are in this case thumbnail representations of the images.

The content items used in the examples are not limiting, and are deliberately chosen to be simple examples for ease of illustration. More complex, abstract examples of content may include applications itself, as on selecting a visual representation of the application, the user can perform actions on it such as 'uninstall'. Content type allows for a categorisation of content to more easily determine what actions would be available for each individual content item. Generally content items of the same type will have similar actions that can be performed on them.

The device 201 may have access to image files by the files being stored locally in data section 227 of non-volatile memory 221, or by logical coupling via communication subsystem 211 to a remote server where the image files may be stored. An application 225 invoked in RAM 246 may generate the graphical elements of the user interface presented on display 204 as shown in FIG. 4 to allow the user to peruse the image files and to interact with them, by, for example, selecting them for subsequent performance of an action such as viewing, moving, copying, sharing, editing or deletion.

The user interface may allow a user to "select" an individual item, say an image file represented by icon 1211, by performing a "long press" gesture in relation to icon 1211, i.e. a touch and release where the touch is held static on the item for a period exceeding a predetermined period of time (say 300 ms) before being released. A short press (i.e. a touch and release where the touch is held static on the item for a period less than a predetermined period of time before being released, may simply cause the device to display the image in a larger format in display. The term static meaning that the location of the touch input is held in substantially the same location on the touch-sensitive display.

When stating that a gesture or operation is 'performed in relation to an item', this means that the gesture or operation was directed towards a specific content item. For example, while a user may be operating a mouse on a surface separate from the surface of the display of the electronic device, those movements of the mouse may be performed by the user in relation to content displayed on the screen, even if there is no physical connection between the two, only a logical or virtual one. However, as the user input means used in user interface in this embodiment is touch screen-based, the performance of a touch gesture in relation to an item or icon means the user actually physically touching the screen in a location corresponding to the location where the item or icon is displayed.

After the user has selected an item, this may be indicated visually to the user by the user interface providing a visual indicator around the icon representing the item in the display 204. For example, the icon may be highlighted by surrounding the icon by a bold outline, or the icon may be shaded or greyed out, or further still, a tick or cross may be displayed superposed on the icon. In this way, a distinction between selected and non-selected items is communicated to the user.

Figure 5B:
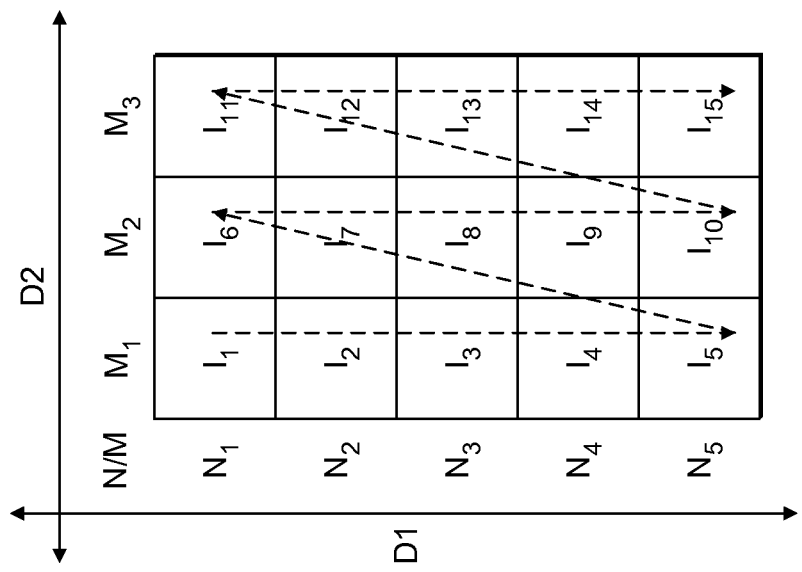
FIGS. 5A and 5B illustrate how, in embodiments, items displayed in grid lists can be ordered in the grid in rows or in columns.
Figure 5A:
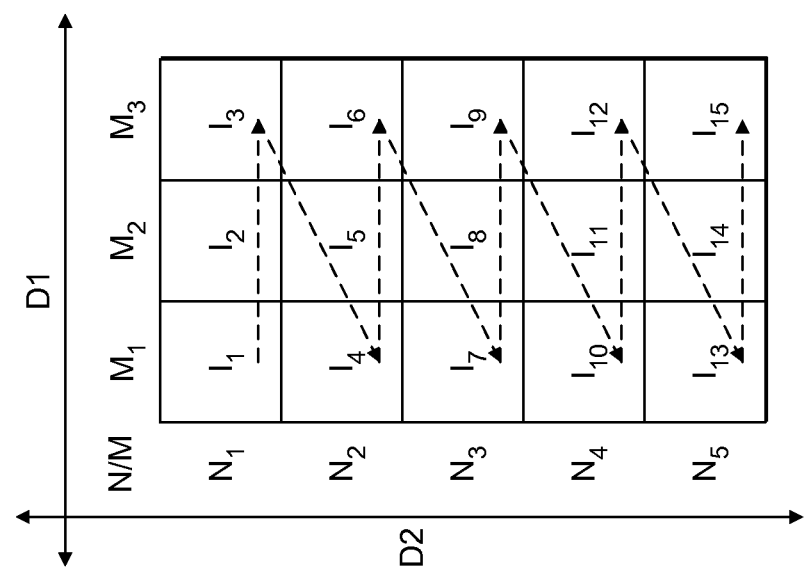

In many cases, where there are plural items in a repository to be displayed to a user for interaction (such as selection thereof and then selective performance of an action), such as files in a folder or, as in FIG. 4, images such as photographs in an album, it is advantageous for the electronic device 201 to display on the display 204 a grid list of icons representing the items. As shown in FIG. 5, the grid list can be arranged to provide the icons representing images $I_1$-$I_{15}$ ordered in the grid:

- in rows $N_i$ (see FIG. 5a, in which the first row $N_1$ includes icons representing images $I_1$-$I_3$, and in which the second row $N_2$ includes icons representing images $I_4$-$I_6$, etc). The rows $N_i$ extend in a first direction D1 and are arranged consecutively (as illustrated by the dotted arrows) in a second direction D2 orthogonal to the first direction. The rows N of the grid list each comprise at least one (but typically plural) column(s) $M_j$. The example shown in FIG. 5a has five rows $N_1$-$N_5$ and three columns $M_1$-$M_3$.

or

- in columns $M_i$ (see FIG. 5b, in which the first row $M_1$ includes icons representing images $I_1$-$I_5$, and in which the second row $N_2$ includes icons representing images $I_6$-$I_{10}$, etc). The columns $M_i$ extend in a first direction D1 and are arranged consecutively (as illustrated by the dotted arrows) in a second direction D2 orthogonal to the first direction. The columns $M_i$ of the grid list each comprise at least one (but typically plural) row(s) $N_j$. The example shown in FIG. 5b has three columns $M_1$-$M_3$ and five rows $N_1$-$N_5$.

Note that the directions D1, D2 in the grid list shown in FIG. 5b having icons ordered in columns $M_i$ are reversed relative to the grid list shown in FIG. 5a having icons ordered in rows $N_i$. Where a row or column is incomplete (for example, due to the end of the list of items being reached), blanks are shown in the last remaining spaces of the grid.

The grid list shown in FIG. 4 is ordered by row, meaning that the icons 1211, 1212, 1213 are ordered in the grid in N rows extending in a first (horizontal) direction and being arranged consecutively in a second (vertical) direction. Each row $N_i$ comprises three columns. The number of rows is greater than six, but as shown in FIG. 4a, only the first six rows $N_1$-$N_6$ are initially displayed, containing images $I_1$-$I_{18}$. In order to display the images above $I_{18}$, the user may perform a swipe or flick gesture in the second direction (upwards in this case) by touching the display and moving the touch upwards on the display. In response to receiving an upward swipe gesture, the grid list is scrolled downwards (or upwards, if reversed) to show the images arranged in previously undisplayed rows.

Should a user desire to cause the same action to be carried out on more than one item (such as sharing or deleting images), rather than requiring a user to repeatedly select individual items and take the action, the user's desired interaction can be facilitated by implementing in the user interface a mechanism by which multiple items can be selected together—such as by a 'multi-select' mode. Once in a multi-select mode, a user may individually select/deselect items by pressing (long pressing, short pressing, or tapping) on their representative icons.

In addition to or in place of a multi-select mode, in embodiments of the disclosure, as shown in FIG. 4, the electronic device 201 is provided with a user interface having a further facility by which, in response to the device receiving user input in the form of a touch starting from a first icon $I_i$ and continuing forwards or backwards in the first direction (horizontally in FIG. 4), items represented by icons adjacent to the first icon forwards or backwards in the ordered grid list are caused to be selected consecutively. Thus by touching an item $I_i$ and moving the touch forwards in a first direction, adjacent items $I_{i+1}$, $I_{i+2}$, $I_{i+3}$ . . . etc can be selected, and by touching an item $I_i$ and moving the touch backwards in a first direction, adjacent items $I_{i-1}$, $I_{-i+2}$, $I_{-3}$ . . . etc can be selected. In order to invoke this multi-select facility by touching and dragging in the first direction, the user interface may or may not require the initial touch on the first item $I_i$ to remain static for a predetermined period of time (i.e. a long press may or may not be required—an initial short press alone, or even less, may be sufficient as the initial dwell time may be completely disregarded).

In embodiments, when the continuous touch remains in the row/column containing the first touched item, the user interface may be configured to cause only the items represented by adjacent icons to have been touched to be selected. When the continuous touch is continued in the first direction beyond the end of the row/column containing the first item, the method comprises causing items represented by icons in the next row/column in the ordered grid list to be selected consecutively.

Thus, as shown in FIG. 4, in FIG. 4a, the user invokes the above-described multi-select facility by first performing a touch starting from a first icon 1211 which, in this case, must first be held static for a period greater than 300 ms, which causes the item represented by first icon 1211 to be selected. A visual indicator may at that point be provided to communicate this selection to the user.

Then, as shown in FIG. 4b, by the user moving the continuous touch horizontally forwards in the ordered grid list row contain the first item 1211, the second item represented by icon 1213 adjacent the icon 1211, which has been touched by the user, is selected.

Then, when the continuous touch is continued in the first direction beyond the end of the row/column containing the first item, as shown in FIG. 4c, that the grid list is automatically scrolled in the second direction. Further, the grid list is scrolled in the second direction when the continuous touch is continued in the first direction beyond the end of the row containing the first item to display another row/column of the grid list:

- when the last visible item in the grid list is selected; or
- to cause the row containing the icon representing the current last selected item to be displayed adjacent the touch.

Thus by the user moving the continuous touch off the end of the row containing the first item 1211, the grid list is scrolled row by row and consecutive items are caused to be selected one after the other. Thus in FIG. 4c, although not shown, the grid list will be scrolled down one row to cause the fourth row to be positioned adjacent the user's touch, and the items represented by icons displayed in that row, including icon 1212, will be selected one after the other, until the last visible item in the grid list is selected or until the touch is released.

The rate of selection of items represented by adjacent icons in the grid list is accelerated in response to the touch being continued in the first direction beyond the end of the row containing the first item or further beyond the end of the row containing the first item. Thus the further the touch is moved beyond the end of the row in the first direction, the faster the consecutive items in the ordered list are selected. In this way, a user may quickly and easily perform the relatively complex interaction of selecting a large number of icons in a grid list by means of a simple user input gesture which is intuitive and immediate.

While not shown in the Figures, in embodiments, for example, where a grid list of selectable items arranged in horizontal rows, each row having only a single column, is provided, the device may be configured such that the selection of multiple items occurs in response to receipt of a touch in relation to an icon representing an item, followed by a drag of the touch in the first (horizontal) direction. This may be without the touch necessarily having to continue off the edge of the row in order to cause the multiple selection to occur. Thus a user may select multiple items in a single row or column grid list merely by touching on an item and dragging the touch in a direct orthogonal to the scrolling direction of the grid list.

To deselect selected items in the same gesture, a user may simply retrace the touch in the opposite direction (in the first direction). Alternatively or in addition, after the continuous touch has ceased, they user interface may cause a selected item to be deselected in response to receipt of a touch in relation to the icon representing the selected item. The multi-select facility may be invoked numerous times throughout the same grid list to allow a user to select multiple adjacent groups of items. In addition, after the multi-select facility has been invoked, the user interface may be configured to automatically enter multi-select mode, in which further individual items can be selected by simply short pressing thereon. In addition, the user interface may be configured to cause multiple items to be selected in response to receipt of a multitouch gesture comprising a simultaneous touch in relation to two icons, the resulting selected items being the items represented by the span in the grid list between the two simultaneously touched icons. While in the multitouch mode, the user interface is still configured to cause the displayed grid list to be scrolled in response to receipt of a touch gesture extending in the second direction (vertical in FIG. 4) including a flick or a swipe.

Embodiments have been described herein by way of example and these embodiments are not intended to be limiting. Rather, it is contemplated that some embodiments may be subject to variation or modification without departing from the spirit and scope of the described embodiments. Further, it is to be understood that the present disclosure includes all permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

For example, while the above interactions described in relation to FIG. 4 are all in relation to a grid list containing items ordered in rows, the same interactions apply in grid lists in which the items are ordered in columns mutatis mutandis, and the skilled reader will be able to understand the adaptations required to transpose the above-described interactions into the domain of the column-ordered grid lists.

Further, while the above-described embodiments refer often to the grid lists containing items that are images or photographs, this is in no way limiting. The ordered grid list of icons may represent one or more of the group comprising: images, photographs, videos, audio files, contacts, documents, spreadsheets, attachments, emails or other files.

Once multiple items have been selected in accordance with the above-described methods, a user may then operate the electronic device 201 to cause a menu with possible actions displayed thereon as menu options to be summoned. The user may then select a menu option to cause the related action to be carried out on the selected items.

Thus while in the embodiments detailed above, the user interface is described based on a touchscreen or multitouch screen user input, the same methodology for selecting multiple items arranged in a grid list could be implemented using gestures received from other forms of user input, including mouse-based gestures or off-screen '3D' inputs detected by way of, for example, one or more camera sensors or motion sensors coupled to the electronic device. In these user input paradigms, the methodology would be the same—a user input would first be received using a pointer-type input (e.g. initiated by a hover in an off-screen 3D input sensing means) in relation to a first item in a grid list, followed by a moving gesture along the first direction to cause items represented by icons adjacent to the first icon forwards or backwards in the ordered grid list to be selected consecutively. These alternative implementations are intended to be within the scope of the present disclosure.

In accordance with embodiments described above and the indicated alternative implementations within the scope of the present disclosure, a user interface for an electronic device may be provided which facilitates an intuitive and immediate mode of interaction by which a user can quickly and easily perform a relatively complex interaction of a selection of multiple items, by way of a simple gesture, in this case a dragged touch gesture.

What is claimed is:

1. A computer-implemented method comprising:
   displaying on a touch sensitive display a grid list of icons representing selectable items, the grid list comprises columns and rows;
   detecting a touch input on a particular icon in an initial row or column of the grid list, the touch input moving in a first direction linearly from the particular icon through a last icon in the initial row or column and the touch input continuing in the first direction linearly beyond the last icon in the initial row or column;
   in response to the touch input continuing in the first direction linearly beyond the last icon:
      causing selection of items represented by icons from the particular icon through the last icon of the initial row or column;
      causing selection of a first icon of a next row or column; and
      causing the grid list to automatically scroll in a second direction to the next row or column, the second direction substantially perpendicular to the first direction; and
      wherein the grid list is scrolled in the second direction when the touch input is continued in the first direction beyond an end of the initial row or column containing a first item to display another row or column of the grid list:
         when a last visible item in the grid list is selected; or
         to cause a row or column containing an icon representing a current last selected item to be displayed adjacent the touch input.

2. A method as claimed in claim 1, further comprising displaying a visual indication of the selection of the items in relation to the representative icons.

3. A method as claimed in claim 1, wherein when the touch input remains in the initial row or column containing the first item, the method comprises causing only the items represented by adjacent icons to have been touched to be selected.

4. A method as claimed in claim 3, wherein when the touch input is continued in the first direction beyond the end of the initial row or column containing the first item, the method comprises causing items represented by icons in the next row or column in the grid list to be selected consecutively.

5. A method as claimed in claim 1, further comprising accelerating a rate of selection of items represented by adjacent icons in the grid list in response to the touch input being continued in the first direction beyond the end of the initial row or column containing the particular item or further beyond the end of the initial row or column containing the particular item.

6. A method as claimed in claim 1, further comprising only causing multiple items to be selected in response to the touch input remaining static in relation to a subsequent icon for a predetermined period of time before continuing.

7. A method as claimed in claim 1, further comprising causing the multiple items to be selected in response to the touch input regardless of a dwell time of the touch input in relation to a subsequent icon before the touch input continues.

8. A method as claimed in claim 1, further comprising deselecting a selected item in response to the touch input being retraced backwards.

9. A method as claimed in claim 1, further comprising, after the touch input has ceased, deselecting a selected item in response to receipt of a touch in relation to the icon representing the selected item.

10. A method as claimed in claim 1, further comprising causing the displayed grid list to be scrolled in response to receipt of a touch gesture including a flick or a swipe.

11. A method as claimed in claim 1, further comprising, entering a multiple select mode of interaction in response to receipt of the touch input, such that all subsequent static touches or continuous touches in relation to icons of the grid list cause the items represented by the icons to be selected or deselected.

12. A method as claimed in claim 1, wherein the grid list of icons represents one or more of the group comprising: images, photographs, videos, audio files, contacts, documents, spreadsheets, attachments, emails or other files.

13. A method as claimed in claim 1, further comprising causing a selection of adjacent items in the grid list even across multiple rows or columns in response to receipt of simultaneous touches on two icons, the items represented by all icons between and including the two icons being selected.

14. An electronic device comprising:
a touch sensitive display for receiving user input;
one or more processors; and
memory comprising instructions which when executed by one or more of the processors cause the electronic device to:
display on the display a grid list of icons representing selectable items, the grid list comprising columns and rows;
detect a touch input on a particular icon in an initial row or column of the grid list, the touch input moving in a first direction linearly from the particular icon through a last icon in the initial row or column and the touch input continuing in the first direction linearly beyond the last icon in the initial row or column;
in response to the touch input continuing in the first direction linearly beyond the last icon:
cause selection of items represented by icons from the particular icon through the last icon of the initial row or column;
cause selection of a first icon of a next row or column to the next row or column; and
cause the grid list to automatically scroll in a second direction, the second direction substantially perpendicular to the first direction; and
wherein the grid list is scrolled in the second direction when the touch input is continued in the first direction beyond an end of the initial row or column containing a first item to display another row or column of the grid list:
when a last visible item in the grid list is selected; or
to cause a row or column containing an icon representing a current last selected item to be displayed adjacent the touch input.

15. A non-transitory computer readable medium comprising instructions which when executed by one or more of the processors of an electronic device having a touch sensitive display for receiving user input, cause the electronic device to:
display on the display a grid list of icons representing selectable items, the grid list comprising columns and rows;
detect a touch input on a particular icon in an initial row or column of the grid list, the touch input moving in a first direction linearly from the particular icon through a last icon in the initial row or column and the touch input continuing in the first direction linearly beyond the last icon in the initial row or column; and
in response to the touch input continuing in the first direction linearly beyond the last icon:
cause selection of items represented by icons from the particular icon through the last icon of the initial row or column;
cause selection of a first icon of a next row or column; and
cause the grid list to automatically scroll in a second direction, the second direction substantially perpendicular to the first direction; and
wherein the grid list is scrolled in the second direction when the touch input is continued in the first direction beyond an end of the initial row or column containing a first item to display another row or column of the grid list:
when a last visible item in the grid list is selected; or
to cause a row or column containing an icon representing a current last selected item to be displayed adjacent the touch input.

16. The method of claim 1, wherein the icons from the particular initial icon through the last icon of the initial row or column and the first icon of the next row or column are selected in a zigzag pattern in response to the touch input continuing linearly through and beyond the last icon.

* * * * *